(No Model.)
W. H. BARNES.
LIVE STOCK LOADER.
No. 286,575.  Patented Oct. 16, 1883.
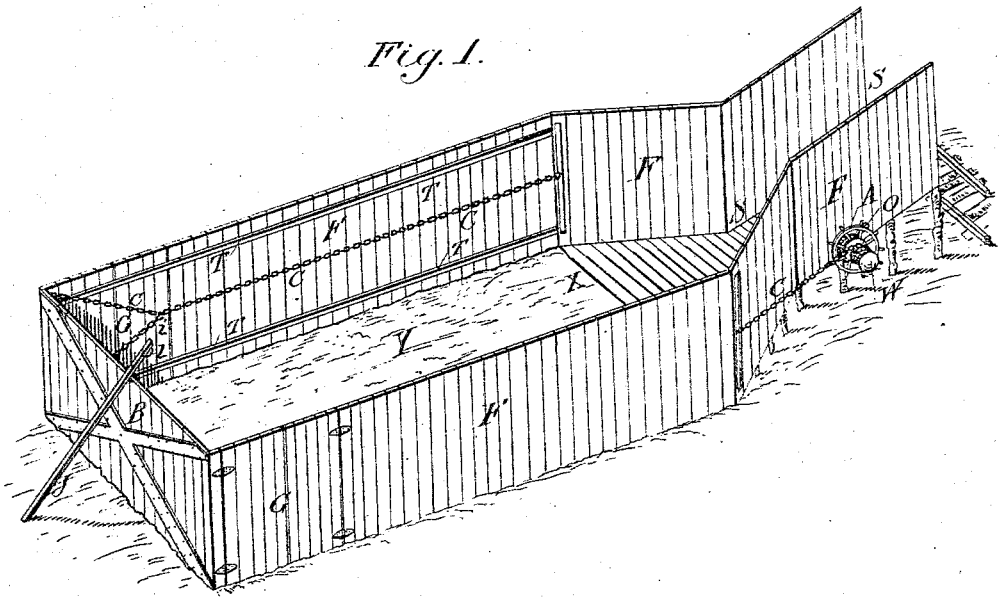
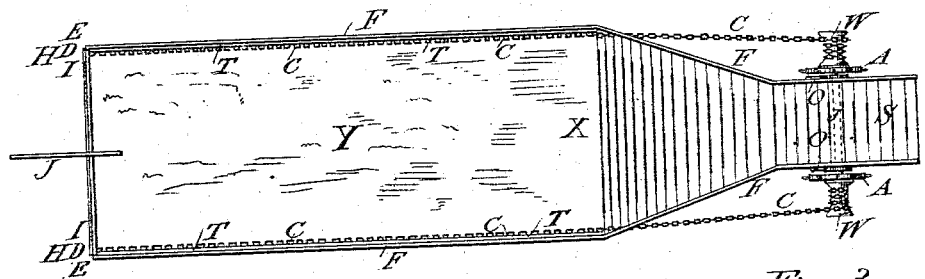
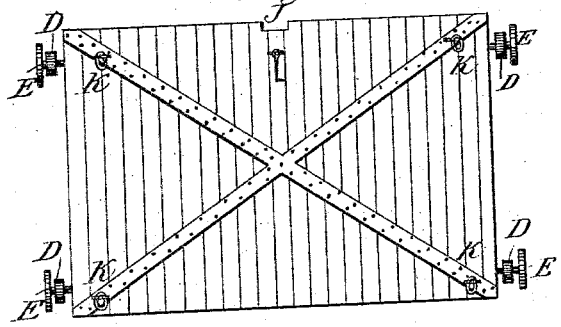
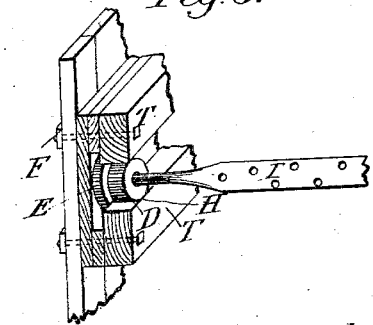
Witnesses:
E. E. Wilson
Thomas Harrison
Inventor:
William H. Barnes

UNITED STATES PATENT OFFICE.

WILLIAM H. BARNES, OF INDEPENDENCE, KANSAS.

LIVE-STOCK LOADER.

SPECIFICATION forming part of Letters Patent No. 286,575, dated October 16, 1883.

Application filed July 21, 1883. (No model.)

*To all whom it may concern:*

Be it known that I, WILLIAM H. BARNES, a citizen of the United States, residing at Independence, in the county of Montgomery and State of Kansas, have invented a new and useful Live-Stock Loader, of which the following is a specification.

My invention pertains to improvements in live-stock loading by means of a movable gate or end to yard, used in conjunction with a windlass and hand wheel or gear, by means of which the yard is so contracted that live stock therein are forced into "chute" to cars or boat.

The objects of my invention are, first, to provide a speedy, sure, and safe way of loading live stock upon cars or boats; and, second, to avoid the brutal beating, clubbing, and prodding to which live stock is now subjected in loading, and which causes live stock to become fevered, crazed, the hides punctured, the flesh diseased and unhealthy. I attain these objects by the mechanism illustrated in the accompanying drawings, in which—

Figure 1 is a perspective view, showing the yard and mechanism. Fig. 2 is a top view of same. Fig. 3 is a sectional view of apparatus or mechanism for holding and facilitating movement of principal part. Fig. 4 is a detailed sectional view of movable end from inside of yard, showing its mechanism.

Similar letters refer to similar parts throughout the several views.

The yard and chute used are similar to those in common use, excepting that the sides must be exactly parallel.

Referring to the drawings, Y represents the yard. F is the fence inclosing yard. S is the chute to cars or boat. These, saving the following improvements, are of the customary forms. B is a movable end, which, by use of the following mechanism, can be forcibly moved to X, thus forcing or loading live stock through chute S. G G are gates for entrance of live stock. These carry with them the portions of track T T attached to them. T T are tracks upon which, by the use of metal roller D, the movable end B is carried. C C are chains attached to B at K K and to the windlass W. This chain unhooks at the point *i*. A is a hand-wheel or crank-gear for turning windlass, suitable ratchets and pawls being provided at O. R is a rod connecting gearing, so that both sides move simultaneously. J is a safety-brace fastened to the top of B, to strengthen same and to take up gain. This is fastened by a pin or hinge, and projects above B, so that it can be grasped from inside and released at bottom, being held thus by use of hook *l* on inside of B; X, point to which B comes. E is a cross-head or disk for safely holding B in place. D is a roller for being used to facilitate movement of B. H is a metal track upon the wooden one for facilitating movement; K K, points at which chains are fastened. To return, the end B is pushed back by hand from the inside.

I am not aware that any similar invention has ever been patented.

What I claim, and desire to secure by Letters Patent, is—

1. The combination of a sliding or movable end with a live-stock yard, for the use and purposes set forth.

2. The combination, in a live-stock yard, of draft-chains C, windlass W, and hand wheel or gearing A, with movable end B, for the purpose of contracting space in live-stock yard, whereby live stock is forced through chute, as described.

3. The combination, with a live stock loader, of a track, of metal or wood, or both, to facilitate the movement of end B, for the purposes set forth.

4. The combination of a guard, E, with movable end in live-stock loader, for use and purpose set forth.

5. The combination of roller D with movable end in live-stock loader, for use and purpose set forth.

6. The combination of rod R to cause simultaneous movement of gearing in live-stock loaders, for the use and purpose set forth.

7. The combination of one or more movable or traveling braces, J, with movable end, in live-stock loaders for strengthening the end and holding gain, said brace being releasable from inside, for the uses and purposes set forth.

WILLIAM H. BARNES.

Witnesses:
E. E. WILSON,
A. D. KEIFER.